United States Patent
Lu et al.

(10) Patent No.: US 8,272,787 B2
(45) Date of Patent: Sep. 25, 2012

(54) CONNECTOR ENCLOSURE

(75) Inventors: Yu Lu, Eden Prairie, MN (US); Thomas G. LeBlanc, Westminster, MA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 18 days.

(21) Appl. No.: 12/825,026

(22) Filed: Jun. 28, 2010

(65) Prior Publication Data
US 2010/0329610 A1 Dec. 30, 2010

Related U.S. Application Data

(62) Division of application No. 12/191,443, filed on Aug. 14, 2008, now Pat. No. 7,744,287.

(60) Provisional application No. 60/970,129, filed on Sep. 5, 2007.

(51) Int. Cl.
G02B 6/38 (2006.01)
G02B 6/00 (2006.01)

(52) U.S. Cl. .......................... 385/56; 385/135

(58) Field of Classification Search .................. 385/56, 385/134, 135
See application file for complete search history.

(56) References Cited

U.S. PATENT DOCUMENTS

| | | | |
|---|---|---|---|
| 2,231,919 A | 2/1941 | Kent | |
| 3,325,591 A * | 6/1967 | Wahl | 174/138 F |
| 3,672,006 A | 6/1972 | Fidrych | |
| 3,858,848 A | 1/1975 | MacFetrich | |
| 3,906,619 A | 9/1975 | Shaffer | |
| 4,368,910 A | 1/1983 | Fidrych | |
| 4,453,291 A | 6/1984 | Fidrych | |
| 4,460,159 A | 7/1984 | Charlebois et al. | |
| 4,684,161 A | 8/1987 | Egner et al. | |
| 4,684,211 A | 8/1987 | Weber et al. | |
| 4,736,978 A | 4/1988 | Cielker | |
| 5,013,125 A | 5/1991 | Nilsson et al. | |
| 5,039,196 A | 8/1991 | Nilsson | |
| 5,067,843 A | 11/1991 | Nova | |
| 5,122,007 A | 6/1992 | Smith | |
| 5,133,583 A | 7/1992 | Wagman et al. | |
| 5,173,573 A * | 12/1992 | Jervis | 174/138 F |
| 5,245,730 A | 9/1993 | Martin | |
| 5,283,930 A | 2/1994 | Krauss | |

(Continued)

FOREIGN PATENT DOCUMENTS
DE 42 00 865 A1 7/1993
(Continued)

OTHER PUBLICATIONS
International Search Report and Written Opinion mailed Nov. 18, 2008.

*Primary Examiner* — Daniel Petkovsek
(74) *Attorney, Agent, or Firm* — Merchant & Gould P.C.

(57) ABSTRACT

A connector enclosure for enclosing a cable assembly includes a main body that has a first body portion and a second body portion. The first body portion is adapted for selective releasable engagement with the second body portion. Each of the first and second body portions defines a cavity having a first connector portion and a second connector portion. The cavity of each of the first and second body portions cooperatively defines a passage through the main body. The passage is configured to retain a cable assembly.

13 Claims, 10 Drawing Sheets

U.S. PATENT DOCUMENTS

| | | |
|---|---|---|
| 5,308,026 A | 5/1994 | Shaw |
| 5,397,859 A * | 3/1995 | Robertson et al. .............. 174/92 |
| 5,480,203 A | 1/1996 | Favalora et al. |
| 5,825,963 A * | 10/1998 | Burgett ........................ 385/135 |
| 5,863,083 A | 1/1999 | Giebel et al. |
| 5,938,180 A | 8/1999 | Walsten |
| 6,266,469 B1 | 7/2001 | Roth |
| 6,396,993 B1 | 5/2002 | Giebel et al. |
| 6,398,422 B1 | 6/2002 | Szilagyi et al. |
| 6,719,274 B2 | 4/2004 | Bowling |
| 6,856,748 B1 * | 2/2005 | Elkins et al. .................. 385/135 |
| 6,993,237 B2 | 1/2006 | Cooke et al. |
| 7,201,600 B2 * | 4/2007 | Sokol et al. ................... 439/367 |
| 7,246,789 B2 | 7/2007 | Ames et al. |
| 7,744,287 B2 | 6/2010 | Lu et al. |
| 2006/0133748 A1 | 6/2006 | Seddon et al. |
| 2006/0233496 A1 * | 10/2006 | Khemakhem et al. .......... 385/75 |
| 2008/0240658 A1 | 10/2008 | Leeman et al. |
| 2009/0238534 A1 | 9/2009 | Ahmed |

FOREIGN PATENT DOCUMENTS

| | | |
|---|---|---|
| EP | 1 058 364 A1 | 12/2000 |
| JP | 59-177504 | 10/1984 |
| WO | WO 2005/072395 A2 | 8/2005 |
| WO | WO 2006/039084 A1 | 4/2006 |
| WO | WO 2008/036994 A1 | 4/2008 |
| WO | WO 2009/040567 A1 | 4/2009 |

* cited by examiner

CONNECTOR ENCLOSURE

CROSS-REFERENCE TO RELATED APPLICATION

This application is a divisional of U.S. patent application Ser. No. 12/191,443, entitled "Connector Enclosure" and filed on Aug. 14, 2008, now U.S. Pat. No. 7,744,287, issued Jun. 29, 2010, which claims the benefit of U.S. Provisional Patent Application Ser. No. 60/970,129, filed Sep. 5, 2007, the disclosure of which is hereby incorporated by reference in its entirety.

TECHNICAL FIELD

The present disclosure relates to connectors, and more particularly, to enclosures for connectors.

BACKGROUND

Optical fiber connectors are used to optically couple one optical fiber to another optical fiber. During installation or repair, an optical fiber connector experiences disruptive forces from time to time. For example, axial forces may be applied to a connector. The axial forces may result from a person inadvertently pulling on a cable which is attached to a connector. If the axial force results in the connector ferrule moving away from an optically coupled opposing ferrule, the optical circuit may be disrupted or disconnected.

SUMMARY

An aspect of the present disclosure relates to a connector enclosure for enclosing a cable assembly. The connector enclosure includes a main body that has a first body portion and a second body portion. The first body portion is adapted for selective releasable engagement with the second body portion. Each of the first and second body portions defines a cavity having a first connector portion and a second connector portion. The cavity of each of the first and second body portions cooperatively defines a passage through the main body. The passage through the main body is generally aligned with the longitudinal axis of the main body and configured to retain a cable assembly.

Another aspect of the present disclosure relates to a connector enclosure assembly. The connector enclosure assembly includes a fiber optic cable assembly including a first fiber optic cable having a first connectorized end, a second fiber optic cable having a second connectorized end, and an adapter in connected engagement with the first connectorized end and the second connectorized end. The connector enclosure assembly further includes a connector enclosure. The connector enclosure includes a main body that has a first body portion and a second body portion. The first body portion is selectively releasably engaged with the second body portion. Each of the first and second body portions defines a cavity having a first connector portion and a second connector portion. The cavity of each of the first and second body portions cooperatively defines a passage through the main body. The first connectorized end of the cable assembly is disposed in the first connector portion of the connector enclosure and the second connectorized end is disposed in the second connector portion. The adapter is disposed in the adapter portion. The cable enclosure is adapted to resist an axial force applied to one of the first and second cables at an interface between one of the first and second connectorized ends and the cable enclosure.

Another aspect of the present disclosure relates to a method for enclosing a cable assembly. The method includes providing a connector enclosure having a main body including a first body portion and a second body portion. The first body portion is adapted for selective releasable engagement with the second body portion. Each of the first and second body portions defines a cavity having a first connector portion, a second connector portion and an adapter portion. The cavity of each of the first and second body portions cooperatively defining a longitudinal passage through the main body. The method further includes inserting a first connectorized end, a second connectorized end and an adapter of a cable assembly into the first connector portion, the second connector portion and the adapter portion of the connector enclosure such that the first connectorized end is disposed adjacent a first shoulder of the second body portion and the second connectorized end is disposed adjacent to a second shoulder. The connector enclosure is adapted to resist an axial force applied to one of the first and second cables at an interface between one of the first and second connectorized ends and one of the first and second shoulders of the connector enclosure. The method further includes engaging the first body portion with the second body portion such that the cable assembly is disposed in the passage of the main body.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
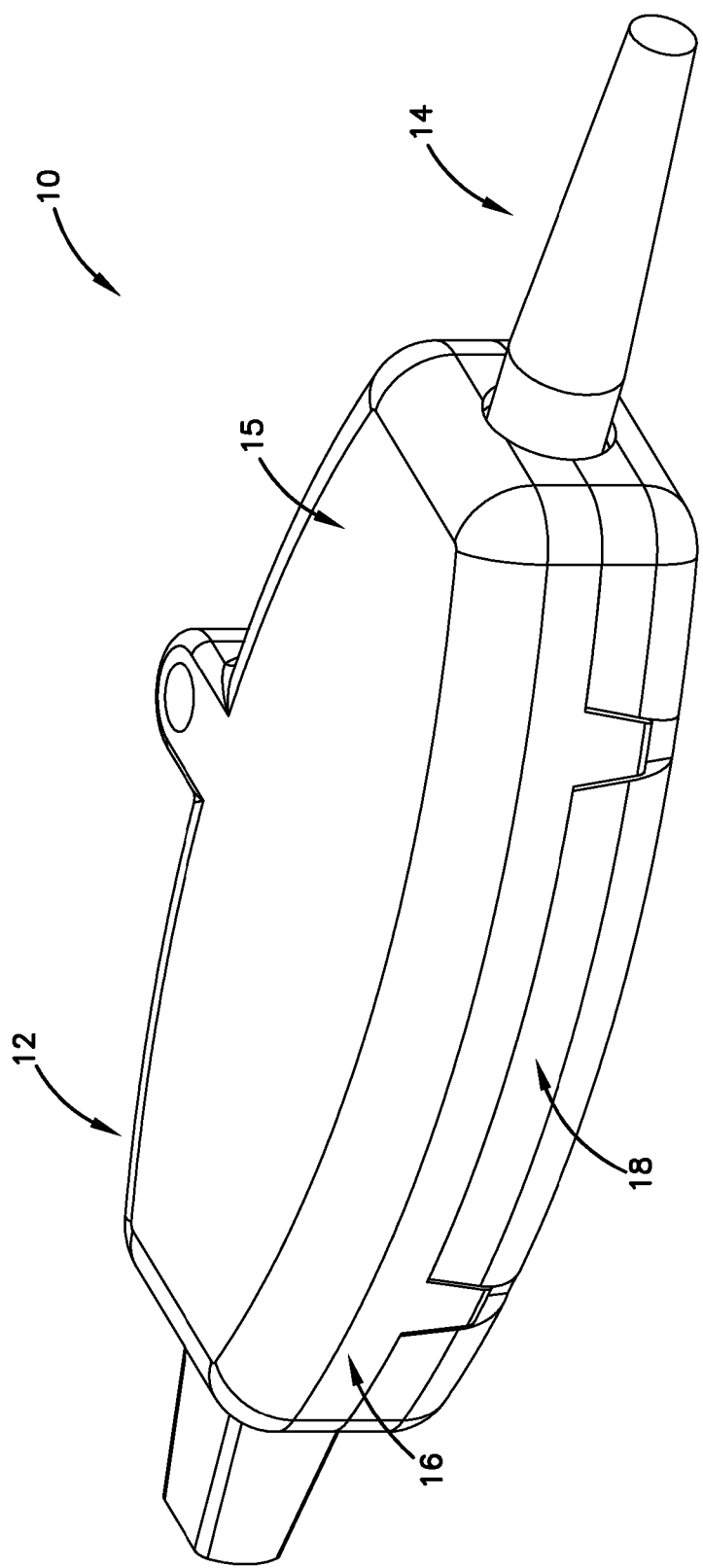
FIG. 1 is a perspective view of a connector enclosure assembly having features that are examples of aspects in accordance with the principles of the present disclosure.
Figure 2:
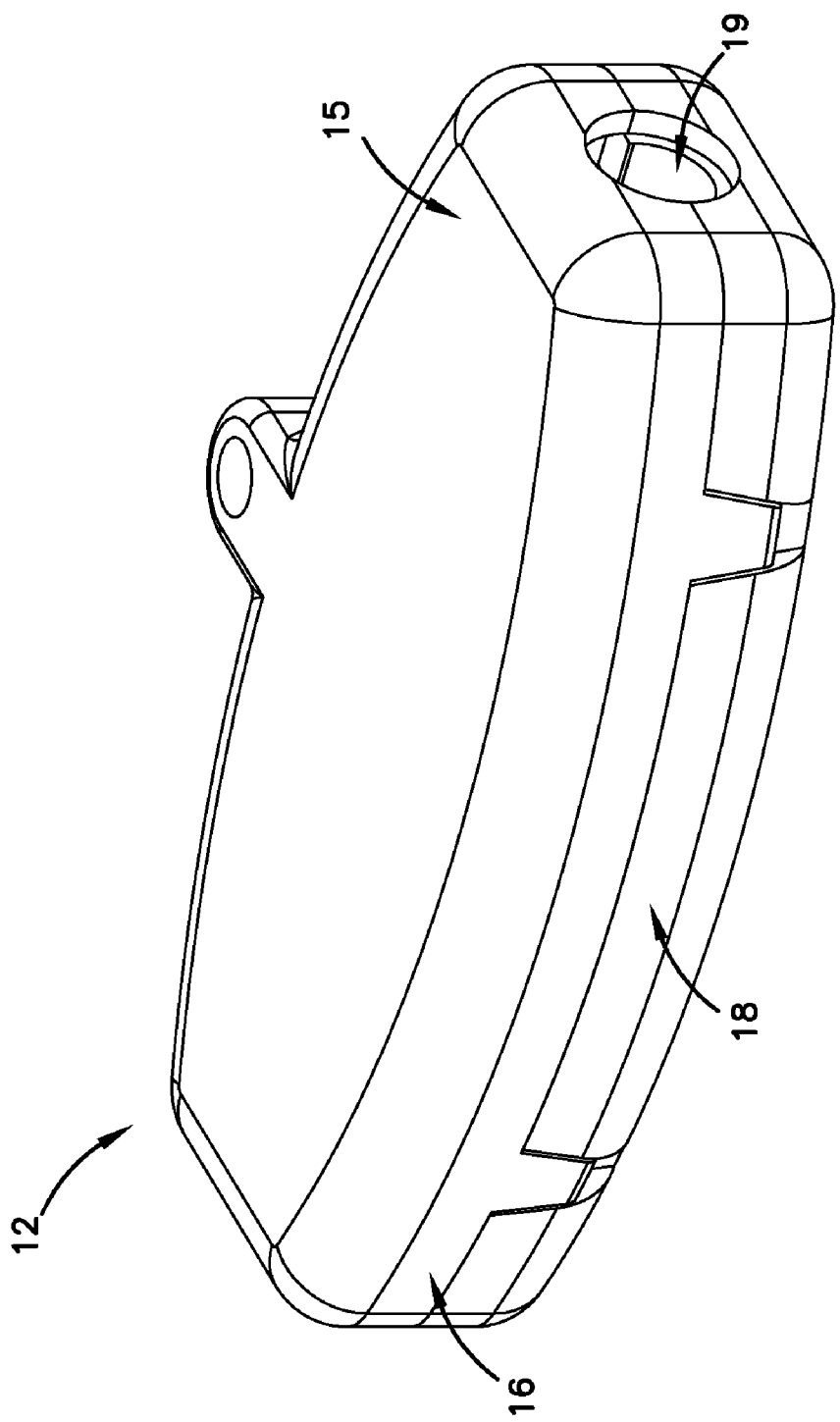
FIG. 2 is a perspective view of the connector enclosure of FIG. 1.

Referring now to FIGS. 1 and 2, a connector enclosure assembly, generally designated 10, is shown in a closed position. The connector enclosure assembly 10 includes a connector enclosure, generally designated 12, and a cable assembly, generally designated 14.

The connector enclosure 12 includes a main body 15 having a first body portion, generally designated 16, that is releasably engaged to a second body portion, generally designated 18. With the first body portion 16 engaged to the second body portion 18, the main body 15 defines a passage 19 (shown in FIG. 2) through the connector enclosure 12.

Figure 3:
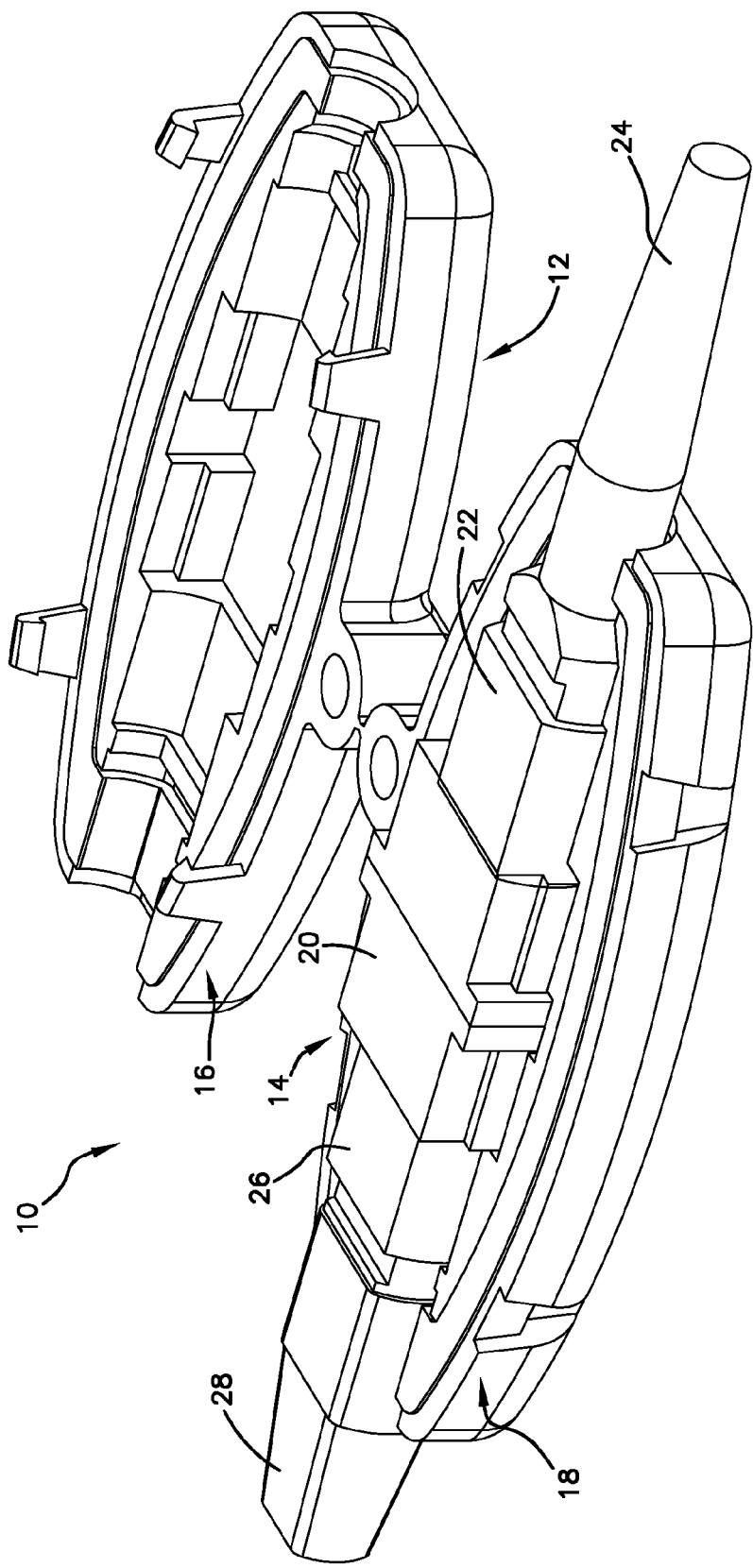
FIG. 3 is a perspective view of the connector enclosure assembly of FIG. 1 in the open position.

Referring now to FIG. 3, the connector enclosure assembly 10 is shown in an open position. The connector enclosure 12 selectively encloses the cable assembly 14. The cable assembly 14 includes an adapter 20 that is in connected engagement with a first connectorized end 22 of a first fiber optic cable 24 and a second connectorized end 26 of a second fiber optic cable 28.

Figure 4:
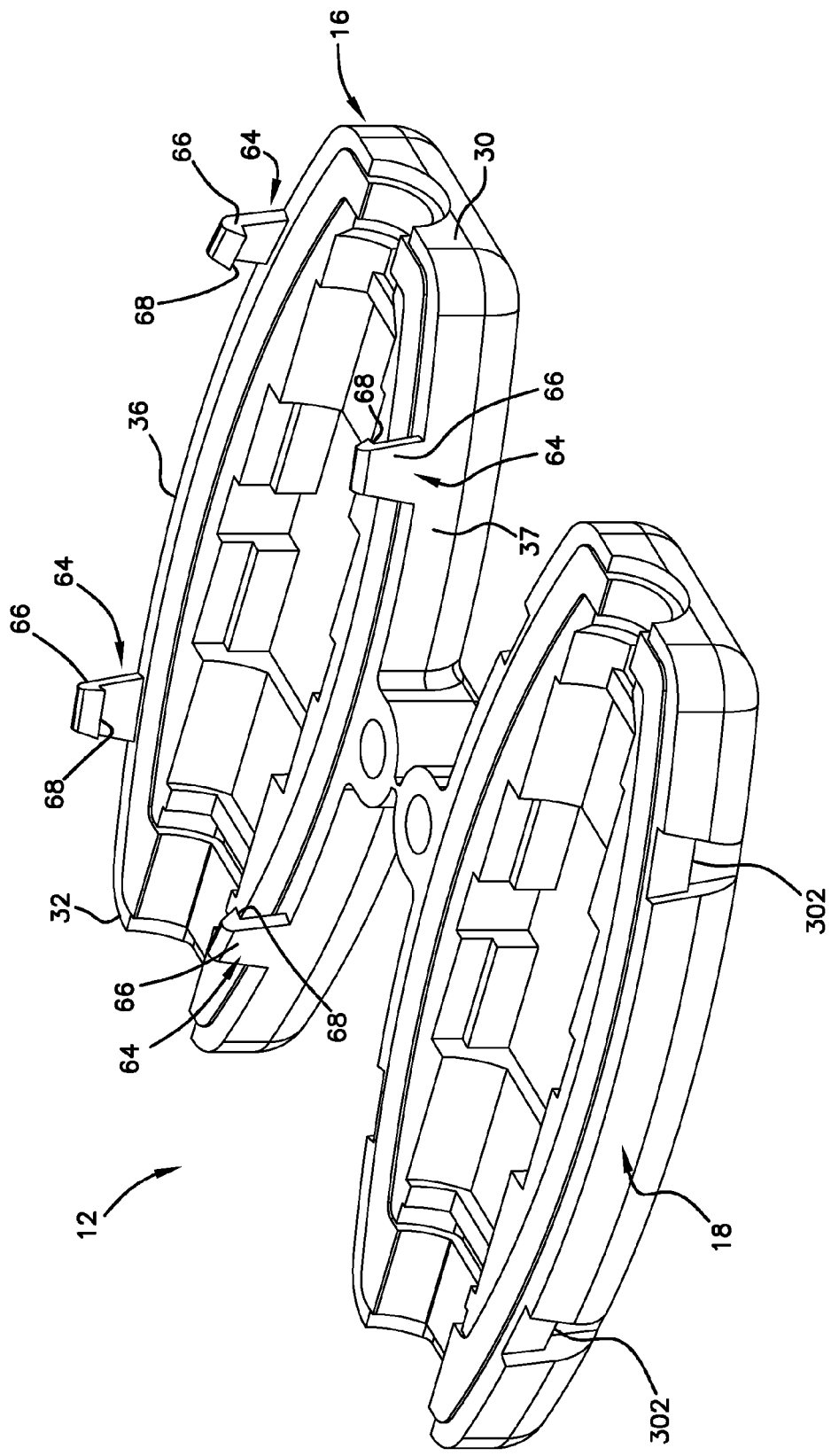
FIG. 4 is a perspective view of the connector enclosure of FIG. 2.
Figure 5:
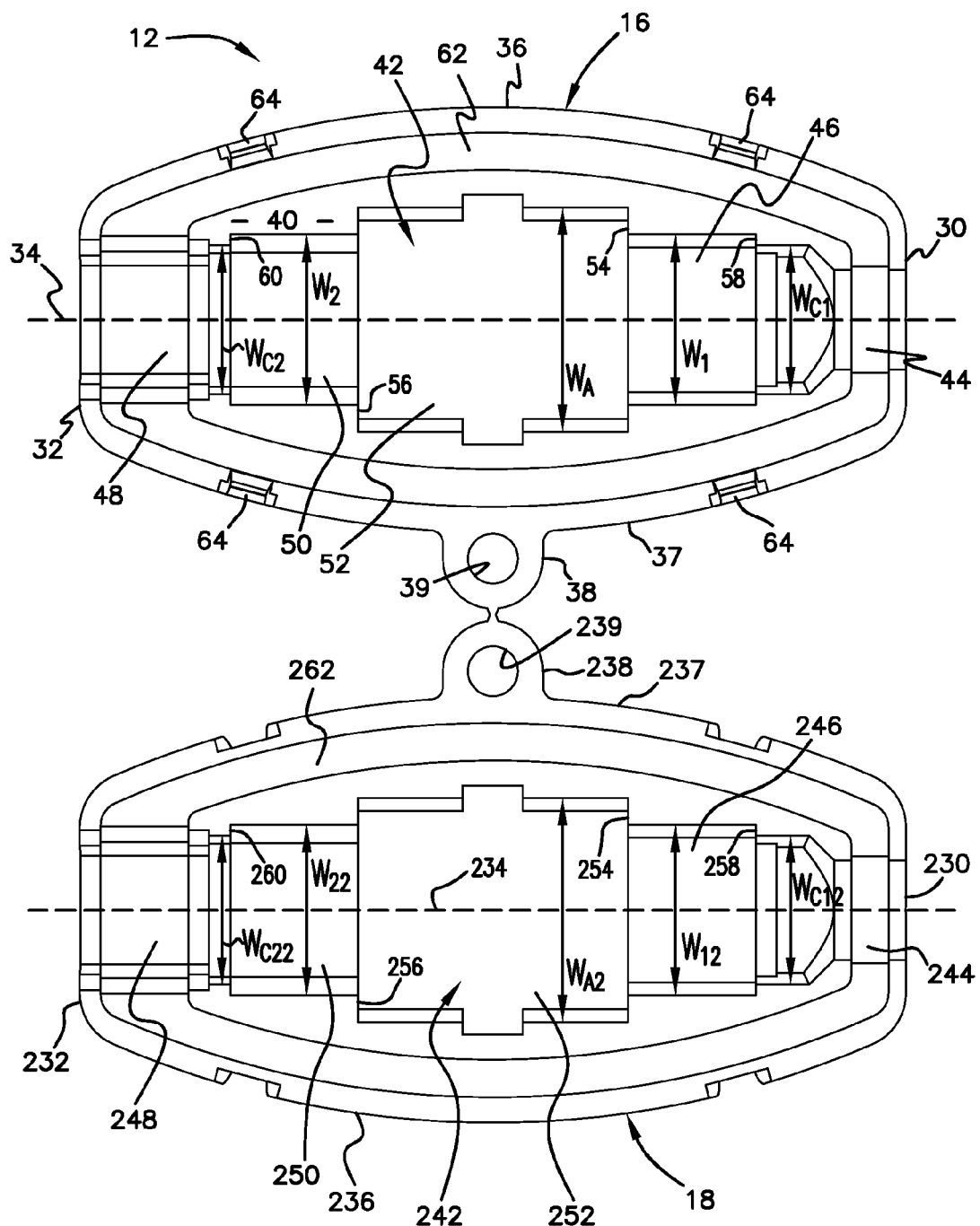
FIG. 5 is a top view of the connector enclosure of FIG. 4.

Referring now to FIGS. 4 and 5, the first body portion 16 of the main body 15 of the connector enclosure 12 includes a first end 30 and an oppositely disposed second end 32. In the subject embodiment, the first and second ends 30, 32 are disposed in a generally transverse direction to a longitudinal axis 34 (shown as a dashed line in FIG. 5). In the subject embodiment, the longitudinal axis 34 is centrally disposed in the passage 19 such that the axis of the passage 19 is collinear with the longitudinal axis 34.

The first body portion 16 includes a first side 36 and an oppositely disposed second side 37. The first and second sides 36, 37 are connected with the first and second ends 30, 32 of the first body portion 16. In the subject embodiment, the first and second sides 36, 37 are integral with the first and second ends 30, 32. It will be understood, however, that the scope of the present disclosure is not limited to the first and second sides 36, 37 being integral with the first and second ends 30, 32.

A mounting tab 38 extends outwardly from the second side 37. In the subject embodiment, the mounting tab 38 extends from the second side 37 in a direction that is generally perpendicular to the longitudinal axis 34. The mounting tab 38 includes a mounting hole 39 for mounting the connector enclosure assembly 10 to a wall or other structure. It will be understood, however, that the scope of the present disclosure is not limited to the first body portion 16 of the connector enclosure 12 having the mounting tab 38.

The first body portion 16 further includes a surface 40. In the subject embodiment, the surface 40 is a generally planar surface that is generally parallel to the longitudinal axis 34. It will be understood, however, that the scope of the present disclosure is not limited to the surface 40 being generally parallel to the longitudinal axis 34.

Figure 6:
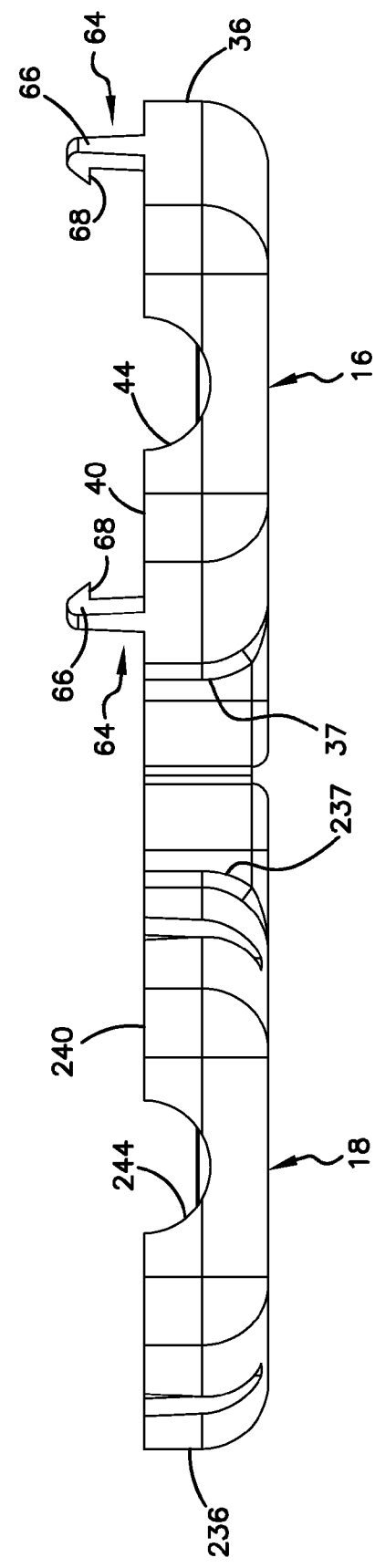
FIG. 6 is a right side view of the connector enclosure of FIG. 4.
Figure 7:
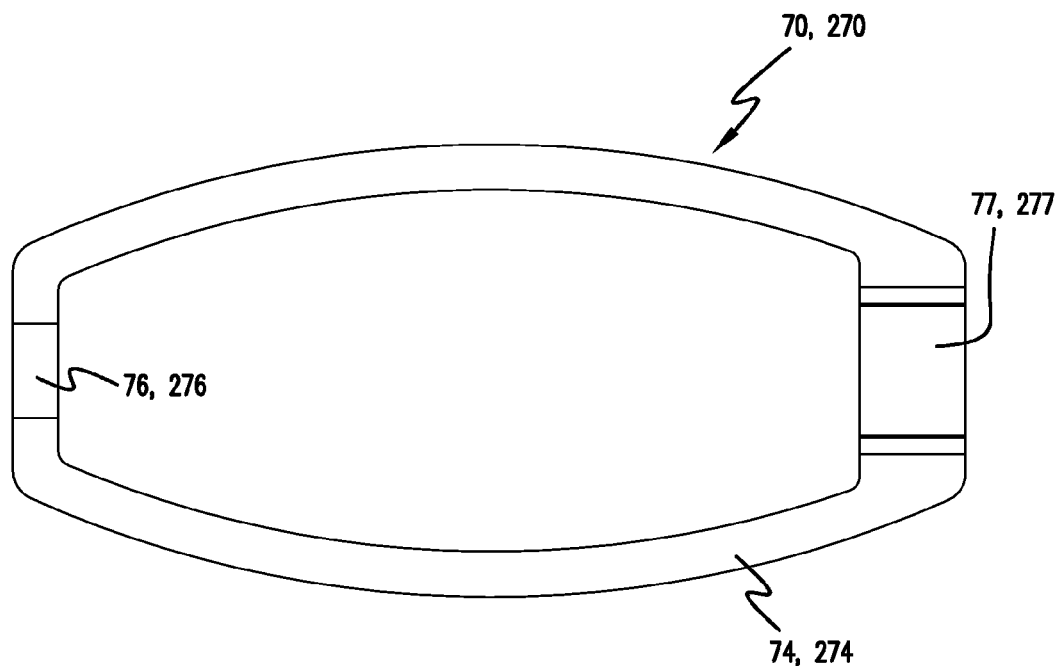
FIG. 7 is a top view of a sealing member suitable for use in the connector enclosure assembly of FIG. 1.
Figure 8:
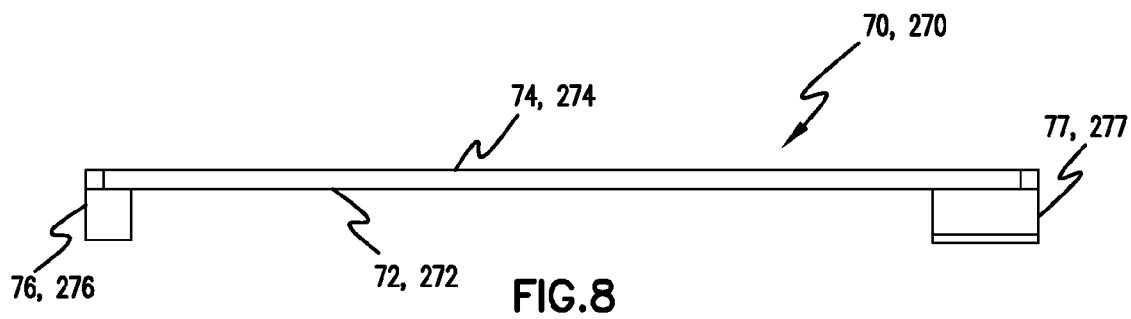
FIG. 8 is a front view of the sealing member of FIG. 7.
Figure 9:
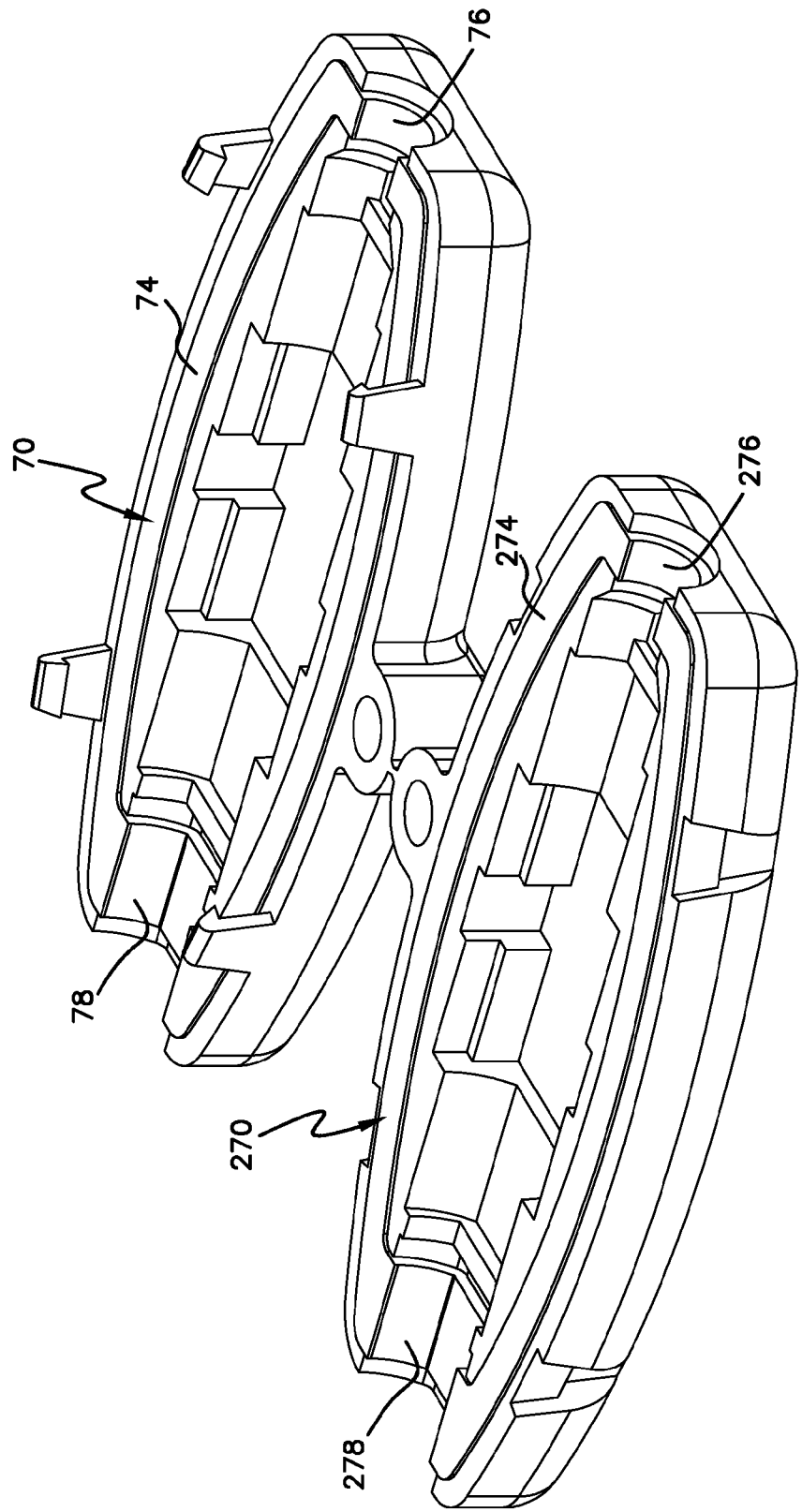
FIG. 9 is a perspective view of the connector enclosure of FIG. 4 with the sealing member of FIG. 7 installed.

Referring now to FIGS. 4-6, the first body portion 16 defines a cavity, generally designated 42, that is disposed in the surface 40. The cavity 42 extends through the first end 30 and the second end 32 of the first body portion 16. The cavity 42 is configured to conform to a portion of the cable assembly 14. In the subject embodiment, the cavity 42 is slightly oversized to assist in inserting the portion of the cable assembly 14 in the cavity 42.

The cavity 42 includes a first cable portion 44 disposed at the first end 30 of the first body portion 16, a first connector portion 46 disposed adjacent to the first cable portion 44, a second cable portion 48 disposed at the second end 32 of the first body portion 16, a second connector portion 50 disposed adjacent to the second cable portion 48, and an adapter portion 52 disposed between the first connector portion 46 and the second connector portion 50.

In the subject embodiment, the adapter portion 52 of the cavity 42 has a width $W_A$ that is larger than a width $W_1$ of the first connector portion 46 thereby forming a first shoulder 54 between the adapter portion 52 and the first connector portion 46. The width $W_A$ of the adapter portion 52 is also larger than a width $W_2$ of the second connector portion 50 thereby forming a second shoulder 56 between the adapter portion 52 and the second connector portion 50.

The width $W_1$ of the first connector portion 46 of the cavity 42 is larger than a width $W_{C1}$ of the first cable portion 44 thereby forming a first connector shoulder 58. The width $W_2$ of the second connector portion 50 is larger than a width $W_{C2}$ of the second cable portion 48 thereby forming a second connector shoulder 60.

The first body portion 16 further defines a sealing groove 62 disposed along the periphery of the surface 40. Extending outwardly from the surface 40 is a plurality of resilient latches 64 (best shown in FIG. 4). In the subject embodiment, the resilient latches 64 extend in a direction that is generally perpendicular to the surface 40. It will be understood, however, that the scope of the present disclosure is not limited to the resilient latches 64 being generally perpendicular to the surface 40. Each of the resilient latches 64 includes a free end 66 having a lip 68 adapted for engagement with the second body portion 18. In the subject embodiment, and by way of example only, there are four resilient latches 64 disposed on the surface 40 of the first body portion 16. Two of the four resilient latches 64 are disposed adjacent the first side 36 and two of the resilient latches 64 are disposed adjacent the second side 37.

In the subject embodiment, the second body portion 18 of the connector enclosure 12 is structurally similar to the first body portion 16. Structure of the second body portion 18 that is similar to structure of the first body portion 16 will have the reference numeral of the structure of the first body portion 16 plus "200". New structure of the second body portion 18 will have reference numerals in excess of "300". It will be understood, however, that the scope of the present disclosure is not limited to the second body portion 18 having similar structure as the first body portion 16.

Referring still to FIGS. 4-6, the second body portion 18 includes a first end 230 and an oppositely disposed second end 232. In the subject embodiment, the first and second ends 230, 232 are disposed in a generally transverse direction to a longitudinal axis 234 (shown as a dashed line in FIG. 5).

The second body portion 18 further includes a first side 236 and an oppositely disposed second side 237. The first and second sides 236, 237 are engaged with the first and second ends 230, 232 of the second body portion 18.

A mounting tab 238 extends outwardly from the second side 237. The mounting tab 238 includes a mounting hole 239 for mounting the connector enclosure assembly 10 to a structure. In the subject embodiment, the mounting tab 238 is disposed on the second body portion 18 such that when the connector enclosure 12 is in the closed position, the mounting tab 238 is aligned with the mounting tab 38 on the first body portion 16. It will be understood, however, that the scope of the present disclosure is not limited to the second body portion 18 of the connector enclosure 12 having the mounting tab 238.

The second body portion 18 further includes a surface 240. In the subject embodiment, the surface 240 is a generally planar surface that is generally parallel to the longitudinal axis 234.

The second body portion 18 defines a cavity, generally designated 242, that is disposed in the surface 240. The cavity 242 extends through the first end 230 and the second end 232 of the second body portion 18. The cavity 242 is configured to conform to a remaining portion of the cable assembly 14.

The cavity 242 includes a first cable portion 244 disposed at the first end 230 of the second body portion 18, a first connector portion 246 disposed adjacent to the first cable portion 244, a second cable portion 248 disposed at the second end 232 of the second body portion 18, a second connector portion 250 disposed adjacent to the second cable portion 248, and an adapter portion 252 disposed between the first connector portion 246 and the second connector portion 250.

In the subject embodiment, the adapter portion 252 of the cavity 242 has a width $W_{A2}$ (shown in FIG. 5) that is larger than a width $W_{12}$ of the first connector portion 246 thereby forming a first shoulder 254 between the adapter portion 252 and the first connector portion 246. The width $W_{A2}$ of the adapter portion 252 is also larger than a width $W_{22}$ of the second connector portion 250 thereby forming a second shoulder 256 between the adapter portion 252 and the second connector portion 250.

The width $W_{12}$ of the first connector portion 246 of the cavity 242 is larger than a width $W_{C12}$ of the first cable portion 244 thereby forming a first connector shoulder 258. The width $W_{22}$ of the second connector portion 250 is larger than a width $W_{C22}$ of the second cable portion 248 thereby forming a second connector shoulder 260.

The second body portion 18 further defines a sealing groove 262 that is disposed along the periphery of the surface 240 and a plurality of catches 302 (shown in FIG. 3) disposed on the first and second sides 236, 237. In the subject embodiment, and by way of example only, there are four catches 302 (best shown in FIG. 4) disposed on the second body portion 18. Two of the four catches 302 are disposed on the first side 236 and two catches 302 disposed on the second side 237. The catches 302 are adapted for engagement with the lip 68 of the resilient latches 64 of the first body portion 16.

Referring now to FIGS. 5-9, a first sealing member, generally designated 70, is adapted for engagement with the sealing groove 62 disposed in the surface 40 of the first body portion 16 of the connector enclosure 12. The first sealing member 70 includes a lower surface 72, an upper surface 74, a first cable end 76 and a second cable end 77. The first sealing member 70 is positioned in the sealing groove 62 such that the first cable end 76 is positioned in the sealing groove 62 in the first cable portion 44 of the first body portion 16 and the second cable end 77 is positioned in the sealing groove 62 in the second cable portion 48 of the first body portion 16. The first sealing member 70 is further positioned such that the lower surface 72 of the first sealing member 70 is in sealing engagement with the sealing groove 62 and the upper surface 74 faces outwardly from the surface 40 of the first body portion 16.

A second sealing member, generally designated 270, that is structurally similar to the first sealing member 70 is adapted for engagement with the sealing groove 262 disposed in the surface 240 of the second body portion 18 of the connector enclosure 12. The second sealing member 270 includes a lower surface 272, an upper surface 274, a first cable end 276 and a second cable end 277. The second sealing member 270 is positioned in the sealing groove 262 such that the lower surface 272 of the second sealing member 270 is in sealing engagement with the sealing groove 262 and the upper surface 274 faces outwardly from the surface 240 of the second body portion 18.

Figure 10:
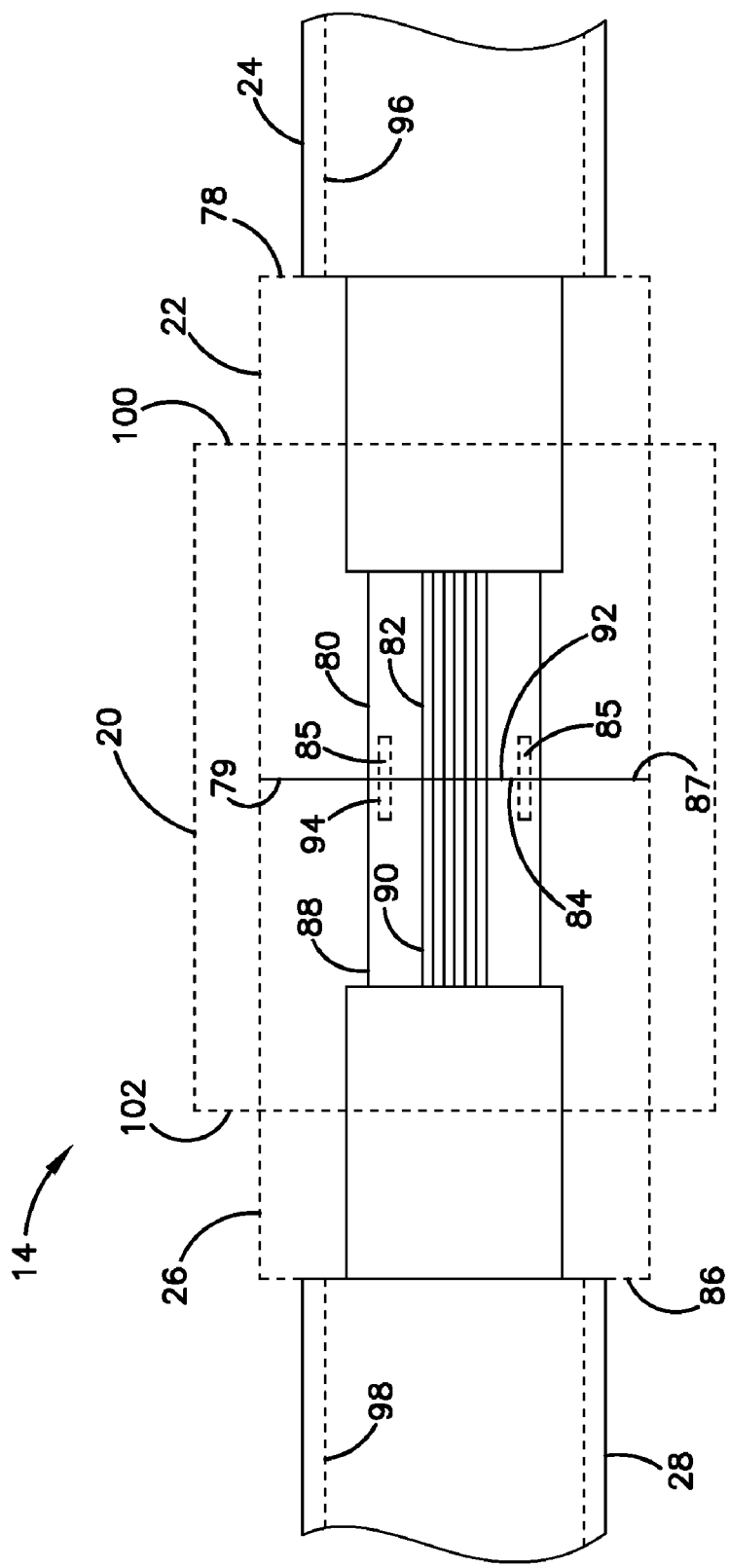
FIG. 10 is a schematic representation of a cable assembly.

Referring now to FIG. 10, an exemplary schematic representation of the cable assembly 14 is shown. The first fiber optic cable 24 includes the first connectorized end 22. The first connectorized end 22 includes a cable side 78 and an adapter side 79. A first ferrule 80 having a plurality of optical fibers 82 from the first fiber optic cable 24 mounted therein is mounted in the first connectorized end 22. The first ferrule 80 includes a polished end 84 and a plurality of alignment pins 85 extending outwardly from the polished end 84.

The second fiber optic cable 28 includes the second connectorized end 26. The second connectorized end 26 includes a cable side 86 and an adapter side 87. A second ferrule 88 having a plurality of optical fibers 90 mounted therein is mounted in the second connectorized end 26. The second ferrule 88 includes a polished end 92 and a plurality of alignment guide holes 94 adapted for receiving the plurality of alignment pins 85 extending from the first ferrule 80 of the first fiber optic cable 24. The engagement of the alignment pins 85 in the alignment guide holes 94 provide alignment between the optical fibers 82 of the first fiber optic cable 24 and the optical fibers 90 of the second fiber optic cable 28. Although the first and the second connectorized ends 22, 26 are described as having multiple optical fibers 82, 90, respectively, it will be understood that the scope of the present disclosure is not limited to the first and second connectorized ends 22, 26 having multiple optical fibers 82, 90 as the first and second connectorized ends 22, 26 could connectors having only a single optical fiber, such as SC, LC, SC duplex, LC duplex, etc.

In the subject embodiment, the first and second fiber optic cables 24, 28 include a strength member 96 (shown as a dashed line in FIG. 10). The strength member 96 provides high tensile strength to the first and second fiber optic cables 24, 28 to prevent damage during high tensile loading of the first and second fiber optic cables 24, 28. In certain embodiments, the strength member 96 can include yarns, fibers, threads, tapes, films, epoxies, filaments or other structures. In the subject embodiment, and by way of example only, the strength member 96 is aramid yarn (e.g., Kevlar, RTM. yarn). Each strength member 96 of the first and second fiber optic cables 24, 28 is anchored (e.g., crimped) to one of the first and second connectorized ends 22, 26, respectively. By anchoring each strength member 96 to one of the first and second connectorized ends 22, 26, a large tensile force (i.e., a pullout force) must be applied in order to separate the first and second fiber optic cables 24, 28 from the first and second connectorized ends 22, 26, respectively. In the subject embodiment, and by way of example only, the pullout force is approximately 600 lbf.

The adapter side 79 of the first connectorized end 22 of the first fiber optic cable 24 is inserted through a first side 98 of the adapter 20 and engaged with the adapter 20. In certain embodiments, the first connectorized end 22 includes resilient tabs that extend from the first connectorized end 22 and engage recesses in the adapter 20 to form a snap-fit engagement between the first connectorized end 22 and the adapter 20.

The adapter side 87 of the second connectorized end 26 of the second fiber optic cable 28 is inserted through a second side 100 of the adapter and engaged with the adapter 20. In certain embodiments, the second connectorized end 26 includes resilient tabs that extend from the second connectorized end 26 and engage recesses in the adapter 20 to form a snap-fit engagement between the second connectorized end 26 and the adapter 20.

With each of the first and second connectorized ends 22, 26 engaged in the adapter 20 and the alignment pins 85 of the first connectorized end 22 engaged in the alignment guide holes 94 of the second connectorized end 26, the polished end 84 of the first ferrule 80 and the polished end 92 of the second ferrule 88 are in mating engagement such that ends of the optical fibers 82 mounted in the first ferrule 80 are mated and aligned with the corresponding ends of the optical fibers 90 mounted in the second ferrule 88.

Referring now to FIGS. 3, 5, and 10, the cavities 42, 242 of the first and second body portions 16, 18 cooperatively define the passage 19 through the connector enclosure 12 when the first and second body portions 16, 18 are in the closed position (shown in FIG. 2). In the subject embodiment, the passage 19 is generally aligned with the longitudinal axis 34, 234 of the main body 15 of the connector enclosure 12. Therefore, the first and second connectorized ends 22, 26 of the cable assembly 14 are generally aligned with the longitudinal axis 34, 234 of the main body 15. In the subject embodiment, the connector enclosure 12 encloses only two connectorized ends 22, 26 of the cable assembly 14.

An exemplary method for installing the cable assembly 14 in the passage 19 of the connector enclosure 12 will now be described. With the second sealing member 270 disposed in the sealing groove 262, a portion of the cable assembly 14 is inserted into the cavity 242 of the second body portion 18. In the subject embodiment and by way of example only, the portion of the cable assembly 14 that is inserted into the cavity 242 of the second body portion 18 is approximately half of the thickness of the cable assembly 14. The cable assembly 14 is inserted into the cavity 242 of the second body portion 18 such that the adapter 20 is disposed between the first shoulder 254 and the second shoulder 256 of the adapter portion 252 of the cavity 242. With the adapter 20 disposed in the adapter portion 252 of the cavity 242, the portion of the first connectorized end 22 extending from the adapter 20 is disposed in the first connector portion 246 such that the cable side 78 of the first connectorized end 22 is adjacent to the first connector shoulder 258. In the subject embodiment, the clearance between the cable side 78 and the first connector shoulder 258 is less than the clearance between the first side 98 of the adapter 20 and the first shoulder 254. The portion of the second connectorized end 26 extending from the adapter 20 is disposed in the second connector portion 250 of the cavity 242 such that the cable side 86 of the second connectorized end 26 is adjacent to the second connector shoulder 260. In the subject embodiment, the clearance between the cable side 86 and the second connector shoulder 260 is less than the clearance between the second side 100 of the adapter 20 and the second shoulder 256. The first and second fiber optic cables 24, 28 are disposed in the first cable portion 244 and the second cable portion 248, respectively.

With the cable assembly 14 disposed in the cavity 242 of the second body portion 18, the first body portion 16 is engaged with the second body portion 18 such that the remaining portion of the cable assembly 14 is disposed in the cavity 42 of the first body portion 16. In the subject embodiment and by way of example only, the remaining portion of the cable assembly that is disposed in the cavity 42 of the first body portion 16 is about half of the thickness of the cable assembly 14. The cable assembly 14 is disposed in the cavity 42 of the first body portion 16 such that the adapter 20 is disposed between the first shoulder 54 and the second shoulder 56 of the adapter portion 52 of the cavity 42. With the adapter 20 disposed in the adapter portion 52 of the cavity 42, the portion of the first connectorized end 22 extending from the adapter 20 is disposed in the first connector portion 46 such that the cable side 78 of the first connectorized end 22 is adjacent to the first connector shoulder 58. The portion of the second connectorized end 26 extending from the adapter 20 is disposed in the second connector portion 50 of the cavity 42 such that the cable side 86 of the second connectorized end 26 is adjacent to the second connector shoulder 60. The first and second fiber optic cables 24, 28 are disposed in the first cable portion 44 and the second cable portion 48, respectively.

The first and second body portions 16, 18 are selectively releasably engaged. With the cable assembly 14 disposed in the cavities 42, 242 of the first and second body portions 16, 18 of the connector enclosure 12, the resilient latches 64 of the first body portion 16 releasably engage the catches 302 of the second body portion 18. To disengage the first body portion 16 from the second body portion 18, the free ends 66 of the resilient latches 64 are pulled away from the catches 302 until the first body portion 16 can be separated from the second body portion 18 without the lips 68 of the resilient latches 64 engaging the catches 302.

With the first and second body portions 16, 18 in the closed position and the cable assembly 14 disposed in the passage 19 of the connector enclosure 12, the upper surface 74 of the first sealing member 70 is in sealing engagement with the upper surface 274 of the second sealing member 270 along the first sides 36, 236, the second sides 37, 237, a portion of the first ends 30, 230, and a portion of the second ends 32, 232 of the first and second body portions 16, 18. The upper surface 74 of the first sealing member 70 is in sealing engagement with the first fiber optic cable 24 in the first cable portion 44 and with the second fiber optic cable 28 in the second cable portion 48 of the cavity 42. The upper surface 274 of the second sealing member 270 is in sealing engagement with the first fiber optic cable 24 in the first cable portion 244 and with the second fiber optic cable 28 in the second cable portion 248 of the cavity 242. In the subject embodiment, the first and second sealing members provide a sealing rating, as defined by the National Electrical Manufacturing Association (NEMA), of 12, which provides a degree of protection against falling dirt, circulating dust, lint, fibers, and filings, and against dripping and light splashing of liquids. It will be understood, however, that the scope of the present disclosure is not limited to the connector enclosure 12 having a NEMA rating of 12.

With the cable assembly 14 disposed in the passage 19 of the connector enclosure 12, the cable assembly 14 is protected against tensile forces disengaging the mating connection between the optical fibers 82 of the first ferrule 80 in the first connectorized end 22 and the optical fibers 90 of the second ferrule 88 in the second connectorized end 26. If the connector enclosure assembly 10 is fastened to a structure (not shown) and an axial force is applied to the first fiber optic cable 24 in a direction away from the second fiber optic cable 28, the cable assembly 14 moves in the passage 19 until the cable side 78 of the first connectorized end 22 of the first fiber optic cable 24 abuts the first connector shoulders 58, 258 of the first and second body portions 16, 18. With the cable side 78 abutting the first connector shoulders 58, 258, a reaction force occurs at the interface between the cable side 78 of the first connectorized end 22 of the first fiber optic cable 24 and the first connector shoulders 58, 258. Thus, the connector enclosure 12 resists the axial force applied to the first fiber optic cable 24 at the interface between the first connectorized end 22 and the first connector shoulders 58, 258. If the cable assembly 14 was not disposed in the connector enclosure 12 and an axial force was applied to the first fiber optic cable 24 in a direction away from the second fiber optic cable 28, the reaction force would occur at the interface between the first connectorized end 22 and the adapter 20. Therefore, in the present example, the connector enclosure 12 relocates the reaction force from the interface between the first connectorized end 22 and the adapter 20 to the interface between the first connectorized end 22 and the connector enclosure 12. As the tensile strength of the interface between the connector enclosure 12 and the first connectorized end 22 is greater than the tensile strength between the first connectorized end 22 and the adapter 20, the connector enclosure assembly 10 can withstand greater tensile forces without disrupting the engagement between the optical fibers 82 of the first ferrule 80 and the optical fibers 90 of the second ferrule 88.

Figure 11:
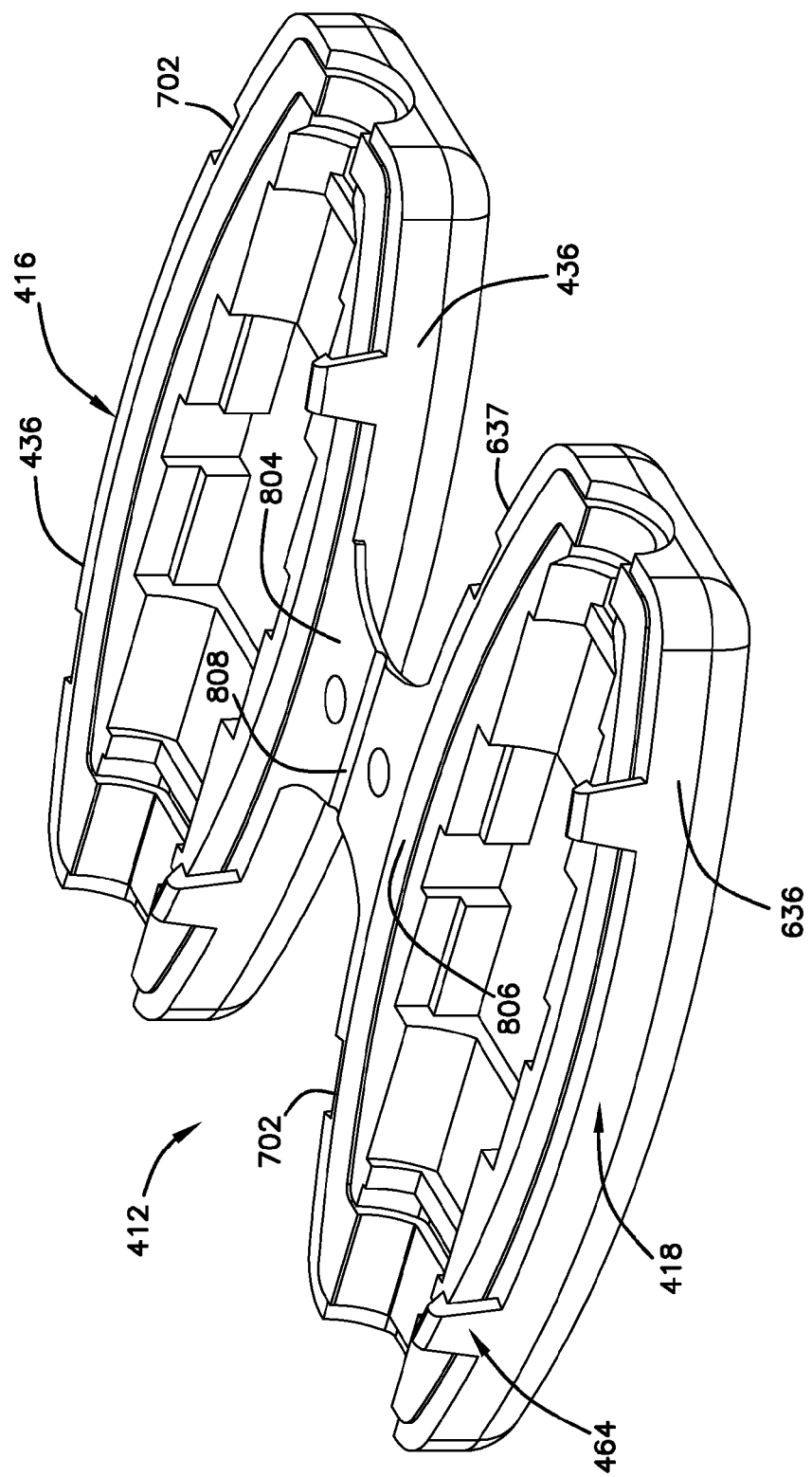
FIG. 11 is a perspective view of an alternate embodiment of a connector enclosure having features that are examples of aspects in accordance with the principles of the present disclosure.

Referring now to FIG. 11, an alternate embodiment of a connector enclosure 412 is shown. In the subject embodiment, the alternate connector enclosure 412 is structurally similar to the connector enclosure 12. Structure of the alternate connector enclosure 412 that is similar to structure of the connector enclosure 12 will have the reference numeral of the structure of the connector enclosure 12 plus "400". New structure of the second body portion 18 will have reference numerals in excess of "800". It will be understood, however, that the scope of the present disclosure is not limited to the alternate connector enclosure 412 having similar structure as the connector enclosure 12.

The alternate connector enclosure 412 includes a first body portion 416 and a second body portion 418. In the subject embodiment, the first body portion 416 is in connected engagement with the second body portion 418 through a living hinge, generally designated 802.

The living hinge 802 includes a first portion 804 and an oppositely disposed second portion 806. The first portion 804 is in connected engagement with the first body portion 416 while the second portion 806 is in connected engagement with the second body portion 418. In the subject embodiment, the first portion 804 is integral with the first body portion 416 and the second portion 806 is integral with the second body portion 418.

The living hinge 802 defines a bend recess 808 between the first portion 804 and the second portion 806. The bend recess 808 is an area of decreased thickness that allows for the living hinge 802 to repeatedly bend at that location. The living hinge 802 further defines mounting holes 439, 639. The mounting holes 439, 639 are disposed in the living hinge 802 such that when the first body portion 416 and the second body portion 418 are in the closed position, the mounting holes 439, 639 are generally aligned.

In the alternate embodiment of the connector enclosure 412, a plurality of resilient latches 464 extend outwardly from a surface 440 of the first body portion 416 adjacent to a second side 437 and from a surface 640 of the second body portion 418 adjacent a first side 436. A plurality of catches 702 is disposed on a first side 436 of the first body portion 416 and on a second side 637 of the second body portion 418.

In yet another embodiment of a connector enclosure, the connector enclosure encloses the adapter 20, the first connectorized end 22 of the first fiber optic cable 24, a first relief boot that is added over the junction of the first fiber optic cable 24 and the first connectorized end 22, the second connectorized end 26 of the second fiber optic cable 28 and a second relief boot that is added over the junction of the second fiber optic cable 28 and the second connectorized end 26.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. A connector enclosure assembly, comprising:
    a connector enclosure including:
        a main body including a first body portion and a second body portion, wherein the first body portion is adapted for selective releasable engagement with the second body portion; and
        each of the first body portion and the second body portion defining a cavity having a first connector portion, a second connector portion, and an adapter portion disposed between the first and second connector portions, the cavity of each of the first and second body portions cooperatively defining a passage through the main body that is generally aligned with a longitudinal axis of the main body; and
    a fiber optic cable assembly including:
        a first fiber optic cable having a first connectorized end disposed in the first connector portions of the first and second body portions of the connector enclosure;
        a second fiber optic cable having a second connectorized end disposed in the second connector portions of the first and second body portions of the connector enclosure; and
        an adapter in connected engagement with the first connectorized end and the second connectorized end, the adapter being disposed in the adapter portions of the first and second body portions of the connector enclosure;
    wherein an axial clearance between the first connectorized end of the first fiber optic cable and the first connector portions of the connector enclosure is less than an axial clearance between the adapter and the adapter portions of the connector enclosure so that a tensile force applied to the first fiber optic cable is resisted at an axial interface between the first connector portions of the connector enclosure and the first connectorized end.

2. A connector enclosure assembly as claimed in claim 1, wherein the first body portion includes at least one resilient latch for releasably engaging the second body portion.

3. A connector enclosure assembly as claimed in claim 1, wherein the first body portion includes a sealing groove in which is disposed a sealing member.

4. A connector enclosure assembly as claimed in claim 3, wherein the first body portion is in sealing engagement with the second body portion when the connector enclosure is in a closed position.

5. A connector enclosure assembly as claimed in claim 4, wherein the connector enclosure has a National Electrical Manufacturing Association (NEMA) rating of 12.

6. A connector enclosure assembly as claimed in claim 1, wherein a width of the adapter portion is larger than a width of the first connector portion.

7. A connector enclosure assembly as claimed in claim 1, wherein the main body includes a mounting tab that is adapted for mounting the connector enclosure to a structure.

8. A connector enclosure assembly as claimed in claim 1, wherein the first body portion is in connected engagement with the second body portion by a living hinge.

9. A connector enclosure assembly as claimed in claim 8, wherein the living hinge is integral with the first and second body portions.

10. A method for enclosing a cable assembly, the method comprising:
    providing a connector enclosure having a main body including a first body portion and a second body portion, the first body portion being adapted for selective releasable engagement with the second body portion, wherein each of the first and second body portions defines a cavity having a first connector portion, a second connector portion, and an adapter portion, the cavity of each of the first and second body portions cooperatively defining a passage through the main body that is generally aligned with a longitudinal axis of the main body;

inserting a first connectorized end of a first fiber optic cable, a second connectorized end of a second fiber optic cable, and an adapter of a fiber optic cable assembly into the first connector portion, the second connector portion, and the adapter portion of the second body portion of a connector enclosure such that the first connectorized end is disposed adjacent to a first shoulder of the second body portion while the second connectorized end is disposed adjacent to a second shoulder, wherein the cable enclosure is adapted to resist a tensile force applied to one of the first and second cables at an axial interface between one of the first and second connectorized ends and one of the first and second shoulders of the connector enclosure and wherein an axial clearance between the first connectorized end of the first fiber optic cable and the first connector portions of the connector enclosure is less than an axial clearance between the adapter and the adapter portions of the connector enclosure so that the tensile force applied to the first fiber optic cable is resisted at an axial interface between the first connector portions of the connector enclosure and the first connectorized end; and engaging the first body portion with the second body portion such that the fiber optic cable assembly is disposed in the passage of the main body.

11. A method for enclosing a cable assembly as claimed in claim 10, wherein a portion of the first connectorized end of the fiber optic cable assembly is disposed in the first connector portion of the cavity of the second body portion and a portion of the second connectorized end of the fiber optic cable assembly is disposed in the second connector portion of the cavity of the second body portion.

12. A method for enclosing a cable assembly as claimed in claim 11, wherein a portion of the first fiber optic cable of the fiber optic cable assembly is disposed in a first cable portion of the connector enclosure and the second fiber optic cable of the fiber optic cable assembly is disposed in a second cable portion of the connector enclosure.

13. A method for enclosing a cable assembly as claimed in claim 12, wherein the first shoulder is disposed between the first cable portion and the first connector portion of the connector enclosure and the second shoulder is disposed between the second cable portion and the second connector portion.

* * * * *